(12) United States Patent
Nalbant (10) Patent No.: US 9,560,705 B1
(45) Date of Patent: Jan. 31, 2017

(54) MAGNETIC AMPLIFIER ASSISTED LED CONSTANT CURRENT SINK OVERHEAD VOLTAGE REGULATION

(71) Applicant: MAXIM INTEGRATED PRODUCTS, INC., San Jose, CA (US)

(72) Inventor: Mehmet Nalbant, Cupertino, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 177 days.

(21) Appl. No.: 14/266,613

(22) Filed: Apr. 30, 2014

Related U.S. Application Data (62) Division of application No. 12/754,480, filed on Apr. 5, 2010, now Pat. No. 8,742,685.

(51) Int. Cl.
*H05B 37/02* (2006.01)
*H05B 33/08* (2006.01)

(52) U.S. Cl.
CPC ........ *H05B 33/083* (2013.01); *H05B 33/0815* (2013.01)

(58) Field of Classification Search
CPC .............. H05B 33/083; H05B 33/0815; H05B 33/0827; H05B 33/08; H05B 33/0818; H05B 33/0845; H05B 37/02; H05B 37/036; H02M 2001/009; H02M 1/36; Y10T 307/713; H02J 3/00
USPC ............... 315/294, 291, 299, 186, 192, 177, 180,315/185 R, 161, 209 R, 220, 312, 254
See application file for complete search history.

(56) References Cited

U.S. PATENT DOCUMENTS

| | | | |
|---|---|---|---|
| 7,071,582 B2* | 7/2006 | Sae-Ueng | H02M 1/36 307/83 |
| 2004/0189548 A1* | 9/2004 | Takeuchi | G09G 3/20 345/55 |
| 2008/0211419 A1* | 9/2008 | Garrity | H05B 33/0815 315/224 |
| 2010/0001661 A1* | 1/2010 | Huang | H05B 33/0818 315/294 |
| 2013/0293126 A1* | 11/2013 | Chen | H05B 33/0815 315/186 |

* cited by examiner

*Primary Examiner* — Jimmy Vu
*Assistant Examiner* — Henry Luong
(74) *Attorney, Agent, or Firm* — TIPS Group (57) ABSTRACT

A power circuit includes a plurality of LED strings, each LED string having multiple LEDs connected in series. A plurality of magnetic amplifiers, reset current sources, and a control circuit are used to drive each LED string with equal current and to independently regulate the amount of voltage supplied to each LED to maximize efficiency. One magnetic amplifier, one reset current source, and one current sink are dedicated to each LED string. The control circuit measures the voltage drop across each LED string and determines an amount of reset control current in response to the measured voltage drop. The reset control current is supplied by the reset current source to the magnetic amplifier dedicated to the regulated LED string. The amount of reset control current supplied to the magnetic amplifier dictates the amount of voltage supplied to the LED string.

16 Claims, 8 Drawing Sheets

MAGNETIC AMPLIFIER ASSISTED LED CONSTANT CURRENT SINK OVERHEAD VOLTAGE REGULATION

CROSS REFERENCE TO RELATED APPLICATIONS

This application is a division of U.S. Ser. No. 12/754,480, filed Apr. 5, 2010, which is incorporated herein by reference.

FIELD OF THE INVENTION

The present invention relates to the field of power converters. More particularly, the present invention relates to the field of regulating voltage applied to LEDs using magnetic amplifiers.

BACKGROUND OF THE INVENTION

Light emitting diodes (LEDs) are increasingly being used for backlighting within display devices, such as liquid crystal display (LCD) televisions and monitors. Older technologies utilize CCFLs (cold cathode fluorescent lamps) for backlighting. The use of CCFLs has numerous drawbacks. For example, CCFLs contain mercury, which is a toxic material. CCFLs also require very large voltages to operate, such as between 1 kV to 5 kV. As a result, providing the driving function of CCFLs is difficult. The use of LEDs overcomes these drawbacks. LEDs do not contain mercury, and a single LED can operate at approximately 3.5 volts, which eases the system design requirements. Further, LEDs have a much longer operating life than CCFLs. The operating life of a CCFL is approximately 20,000 hours, where the operating life is defined as the period of time over which the brightness of the CCFL is maintained above a threshold level, such as one-half the original brightness. The comparable operating life of an LED is up to 50,000 hours.

In the context of backlighting applications, LEDs also suffer from drawbacks. Typically, an LCD television uses 200 or more LEDs, depending on the display screen size. In one configuration, the LEDs are connected in series. In this series configuration, the 200+ LEDs times 3.5 volts per LED still results in 700+V. In another configuration, the LEDs are divided into multiple strings, where each string includes a smaller subset of LEDs. For example, a 45-50 inch LCD television may have 4-10 LED stings, each string having 50-150 LEDs. LEDs being essentially p-n junction diodes, do not share current equally when connected in parallel. Instead, the LEDs are connected in series as a string, and thus each LED in the string shares the current. The strings then are driven individually. This string configuration enables operation at a lower voltage. The string configuration is the route that manufactures have chosen.

A design challenge of the string based configuration is that in order to provide uniform backlighting, each of the LED strings must be driven with equal current. This requires the use of regulated current sinks, or current sources. A lowest cost approach is to provide a common anode voltage to all LED strings and then regulate the current through each cathode by using linear current sinks built around a transistor, such as a FET or BJT. However, manufactured LEDs do not have identical voltage drops, and therefore the provided anode voltage must accommodate the LED string with the highest voltage drop. This results in increased power loss across the current sinks corresponding to those LED strings having lower voltage drops. Although individual LEDs or even LED strings can be binned according to similar voltage drops, this comes at an added cost to the LCD panel or television manufacturer. This still does not completely eliminate voltage drop differences in LEDs as all similar LEDs are still not identical and thus still results in some amount of power loss. A more efficient approach is to separately provide an independent anode voltage to each LED string and then regulate the current through the LED string using the linear current sink. The anode voltage applied to a specific LED string is determined according to the voltage drop of the specific LED string, not according to the LED string with the highest voltage drop. This results in optimized power loss across the current sinks. However, providing independent anode voltage to each LED string requires more circuitry and is more costly.

Figure 1:
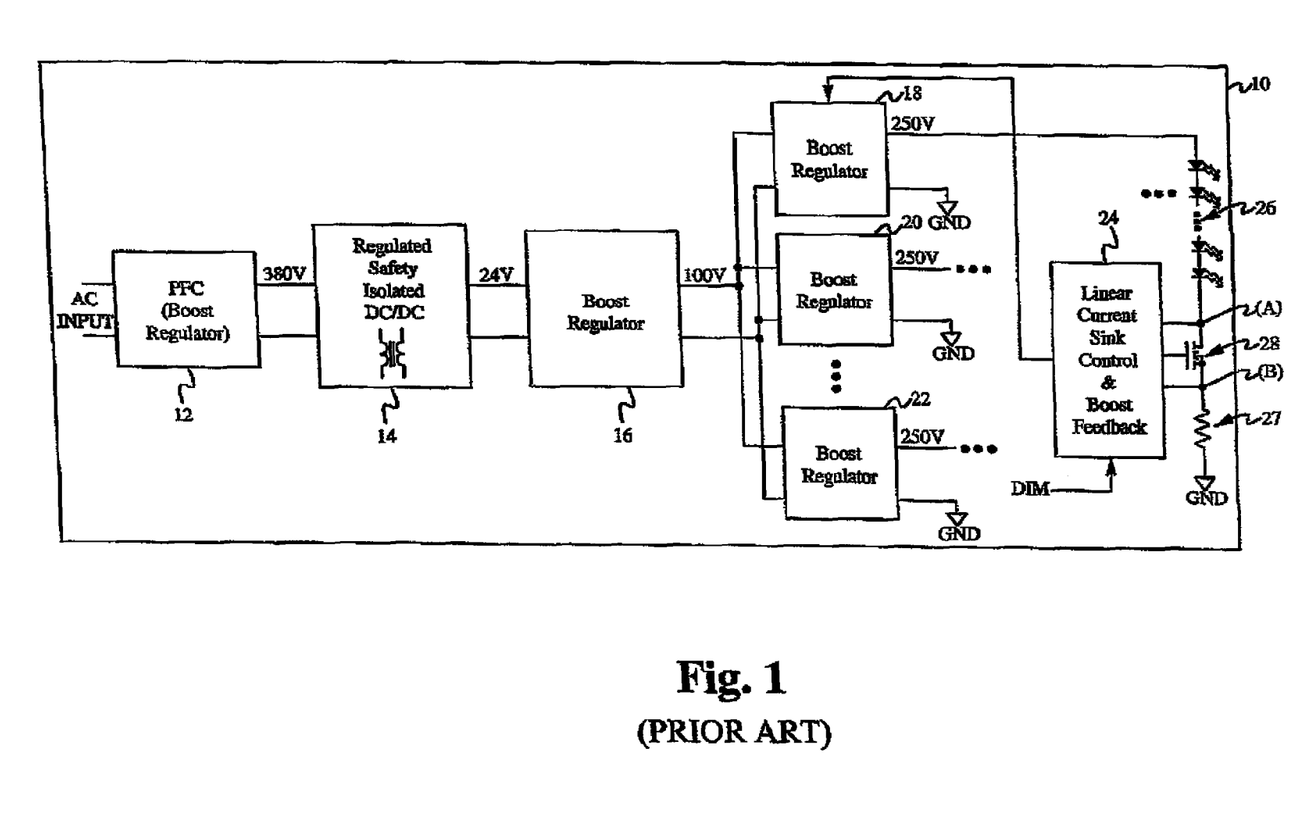
FIG. 1 illustrates a block schematic diagram of an exemplary conventional power circuit used to power a plurality of LED strings.

FIG. 1 illustrates a block schematic diagram of an exemplary conventional power circuit 10 used to power a plurality of LED strings. The power circuit 10 is an example of the second option described above where an independent anode voltage is provided to each LED string. A PFC boost regulator 12 receives and converts an AC input to a full-wave rectified sine wave current and regulates the current to 380 volts DC at the output. A regulated safety isolated DC/DC converter 14 converts the 380 volt signal to 24 volts, which is output to a boost regulator 16. The boost regulator 16 boosts the voltage from 24 volts to 100 volts. In some cases, the converter 14 can be configured to output 100 volts so as to eliminate the boost regulator 16. Multiple boost regulators 18-22 are connected in parallel to the boost regulator 16. There is one boost regulator for each LED string. For simplification, only one LED string 26 is shown in FIG. 1, which is coupled to the boost regulator 18. In implementation, an additional LED string is coupled for each additional boost regulator coupled in parallel to the boost regulator 18. The boost regulators 18-22 each boost the 100 volt input to 250 volts, thereby supplying the necessary voltage at point A for a current sink, such as a transistor 28, to be able to regulate the current for the corresponding LED string, in this case LED string 26.

The transistor 28 is coupled to the cathode of the LED string 26. A separate transistor is similarly coupled to each LED string. A linear current sink control and boost feedback circuit 24 is separately coupled to the cathode of each LED string, such as the LED string 26, and to each transistor, such as the transistor 28. The circuit 24 in conjunction with the current sinks function as current regulators for controlling the current provided to each LED string so that the brightness of each LED string is uniform. Power loss through each current sink, such as the transistor 28, is minimized by sensing the voltage at point A and providing appropriate feedback to the corresponding boost regulator, such as boost regulator 18, to regulate the voltage applied to the anode of each LED string, such as the anode of the LED string 26. There is a minimum compliance voltage that must be maintained at point A in order for the transistor 28 to function as an effective current sink and regulate the current through the LED string 26. The boost regulator 18 adjusts the output boost voltage applied to the anode of the LED string 26 such that the output voltage minus the voltage drop across the LED string 26 is equal to the minimum compliance voltage necessary at point A. A boost voltage that results in a voltage at point A greater than the minimum compliance voltage leads to power loss across the transistor 28. A boost voltage that results in a voltage at point A less than the minimum compliance voltage does not enable the transistor 28 to function as a current sink and therefore does not lead to proper current regulation through the LED string 26.

The minimum compliance voltage at point A can be set to any level, such as 1V, 10V, or 15V. The voltage level is set according to the transistor 28 and the actual voltage drop across the LED string 26. For example, the power circuit manufacturer receives the LEDs from a vendor, but the exact voltage drop for each LED string is not known because the specifications for each LED may vary. In order to accommodate this unknown voltage the power circuit manufacturer has two choices. One, the output of the boost regulator 18 can be fixed to a set output voltage level and the transistor 28 is allowed to absorb the extra voltage, which is the output voltage of the boost regulator 18 minus the voltage drop across the LED string 26. The transistor 28 burns this excess voltage as power by supplying the absorbed voltage as current to the transistor 28. This option presents an inefficient situation because in any given batch of LEDs, each LED string may have a voltage drop that is less than the highest possible voltage drop designed into the circuit. This may result in the total power burned through all the transistors coupled to the LED strings being upwards of a few watts. A way to circumvent this inefficiency is to measure the drain voltage of the transistor 28 (at point A) and supply that measurement as feedback to the boost regulator 18, which then adjusts the output boost voltage accordingly. This feedback method essentially regulates the voltage at point A to the minimum compliance voltage required for the transistor 28 to function as a current sink with the desired amount of current.

In the configuration of FIG. 1, the boost regulator 18 is conductive. The boost regulator 18 optimally adjusts the overhead voltage of the transistor 28 to the value that is necessary to maintain regulation of the current through the LED string 26, but not more than that. This is an optimum situation from an efficiency perspective. However, the power circuit 10 then requires one boost circuit (boost regulator) for each LED string plus a corresponding linear current sink controller circuit 24, one control loop coupled to one of the corresponding boost regulators 18-22. This makes for an expensive and complex system.

Figure 2:
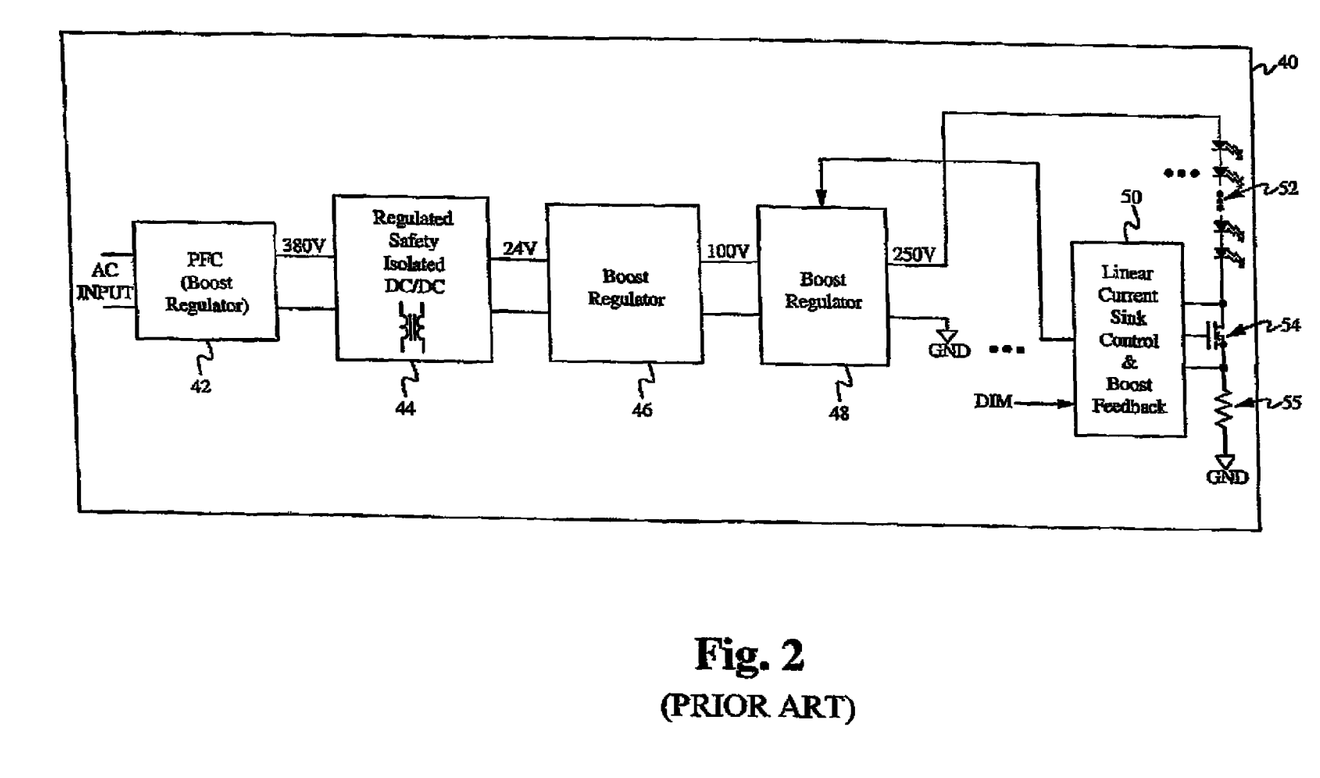
FIG. 2 illustrates a block schematic diagram of another exemplary conventional power circuit used to power a plurality of LED strings.

FIG. 2 illustrates a block schematic diagram of another exemplary conventional power circuit 40 used to power a plurality of LED strings. The power circuit 40 is an example of the first option described above, the lowest cost approach where a common anode voltage is provided to all LED strings. The power circuit 40 of FIG. 2 differs from the power circuit 10 of FIG. 1 in that the power circuit 40 has a single boost regulator 48 (instead of the multiple boost regulators 18-22) and a single boost feedback. The output of the boost regulator 48 is provided as a common boost voltage to the anode of each LED string. A current sink is coupled to each LED string, such as a transistor 54 coupled to a LED string 52. A linear current sink controller 50 includes separate control loops for each LED string and current sink pair. The separate control loops provide the single feedback to the boost regulator 48. The efficiency of the power circuit 40 of FIG. 2 is not as high as the efficiency of the power circuit 10 of FIG. 1. The reason is that the boost voltage is separately provided to each LED string in FIG. 1, and that each LED string current in FIG. 1 is being regulated by a corresponding linear current sink transistor, such as transistor 28, and a corresponding control circuit. Despite the simplicity and lower cost of the power circuit 40 in FIG. 2 compared to the power circuit 10 of FIG. 1, this benefit comes at the expense of lower efficiency because the single boost regulator output voltage must be regulated to level that accommodates the highest LED string voltage drop. In neither configuration, the power circuits do not fully eliminate power loss.

SUMMARY OF THE INVENTION

Embodiments of a power circuit include a plurality of LED strings, each LED string having multiple LEDs connected in series. A plurality of magnetic amplifiers, reset current sources, and a control circuit are used to drive each LED string with equal current and to independently regulate the amount of voltage supplied to each LED to maximize efficiency. One magnetic amplifier, one reset current source, and one current sink are dedicated to each LED string. A power conversion circuit provides isolated power to the plurality of LED strings via the plurality of magnetic amplifiers. The control circuit measures the voltage drop across each LED string and determines an amount of reset control current in response to the measured voltage drop. The reset control current is supplied by the reset current source to the magnetic amplifier dedicated to the regulated LED string. The amount of reset control current supplied to the magnetic amplifier dictates the amount of voltage supplied to the LED string. The control circuit includes a separate control loop coupled to each current sink.

In one aspect, a power circuit includes a magnetic amplifier; a light emitting diode string coupled to an output of the magnetic amplifier, wherein the light emitting diode string includes a plurality of light emitting diodes coupled in series; and a control circuit coupled to the magnetic amplifier and the light emitting diode string, wherein the magnetic amplifier and the control circuit are configured to regulate a current through the LED string. In some embodiments, the power circuit also includes a current sink transistor coupled to the LED string and to the control circuit, wherein the magnetic amplifier and the control circuit are configured to maintain a compliance voltage of the current sink transistor. The control circuit includes an integrated control loop configured to regulate the current through the LED string and to control a reset current supplied to the magnetic amplifier. In some configurations, the power circuit includes a plurality of magnetic amplifiers and a plurality of light emitting diode strings, one magnetic amplifier coupled to one light emitting diode string to form a magnetic amplifier and light emitting diode string pair, wherein the control circuit includes a plurality of control loops, one control loop coupled to one magnetic amplifier and light emitting diode string pair.

In another aspect, a power circuit is disclosed that includes a power conversion module including a transformer, a primary winding of the transformer coupled to a power source; a magnetic amplifier coupled to a secondary winding of the transformer; a light emitting diode string coupled to an output of the magnetic amplifier, wherein the light emitting diode string includes a plurality of light emitting diodes coupled in series; a reset current source coupled to the output of the magnetic amplifier; a current sink coupled to an output of the light emitting diode string; and a control circuit coupled to the reset current source, the light emitting diode string, and to the current sink. In some embodiments, the power conversion module is configured for power factor correction, DC-to-DC conversion and power isolation. In some embodiments, the magnetic amplifier has a saturable magnetic core and one or more windings around at least a portion of the core. In one configuration, the magnetic amplifier has one winding used to transmit power to the light emitting diode string and to receive a reset current from the reset current source. In another configuration, the magnetic amplifier has two windings, a first winding is configured to transmit power to the light emitting diode string and a second winding is configured to receive a reset current from the reset current source. In some embodiments, the reset current source is a transistor. In some embodiments, the current sink is a transistor. A B-H curve of the magnetic amplifier exhibits hysteresis where the magnetic amplifier maintains a flux density with zero current passing through substantially equal to a saturation flux density level. The magnetic amplifier can be configured to pass a power current to the light emitting diode string while in a saturated state and during an on-time of a power supply signal input to the magnetic amplifier. The control circuit can be configured to provide a control signal to the reset current source such that the reset current source forces a reset current through the magnetic amplifier during an off-time of the power supply signal, further wherein the magnetic amplifier changes from the saturated state to a non-saturated state due to the reset current. If changed to the non-saturated state during the off-time, the power current is delayed from passing through the magnetic amplifier during the on-time of the power supply signal until the magnetic amplifier changes from the non-saturated state to the saturated state during the on-time of the power supply signal. An amount of the delay is a function of an amount of the control current. An amount of power provided to the light emitting diode string is an inverse function of the amount of the reset current. In some embodiments, the reset current source, the current sink, and the control circuit are integrated on a same integrated circuit. The control circuit is configured to control the current sink so as to maintain a constant current through the light emitting diode string.

In yet another aspect, the power circuit is configured for a plurality of light emitting diode strings that are individually controlled. In this configuration, the power circuit includes a power conversion module including a transformer, a primary winding of the transformer coupled to a power source; a plurality of magnetic amplifiers coupled in parallel to a secondary winding of the transformer; a plurality of light emitting diode strings, one light emitting diode string coupled to an output of one of the plurality of magnetic amplifiers, wherein each light emitting diode string includes a plurality of light emitting diodes coupled in series; a plurality of reset current sources, one reset current source coupled to the output of one of the plurality of magnetic amplifiers; a plurality of current sinks, one current sink coupled to an output of one of the plurality of light emitting diode strings; and a control circuit coupled to the plurality of reset current sources, to the plurality of light emitting diode strings, and to the plurality of current sinks.

BRIEF DESCRIPTION OF THE DRAWINGS

Embodiments of the power circuit are described relative to the several views of the drawings. Where appropriate and only where identical elements are disclosed and shown in more than one drawing, the same reference numeral will be used to represent such identical elements.

DETAILED DESCRIPTION OF THE EMBODIMENTS

Embodiments of the present application are directed to a power circuit. Those of ordinary skill in the art will realize that the following detailed description of the power circuit is illustrative only and is not intended to be in any way limiting. Other embodiments of the power circuit will readily suggest themselves to such skilled persons having the benefit of this disclosure.

Reference will now be made in detail to implementations of the power circuit as illustrated in the accompanying drawings. The same reference indicators will be used throughout the drawings and the following detailed description to refer to the same or like parts. In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Embodiments of a power circuit include a plurality of LED strings, each LED string having multiple LEDs connected in series. A plurality of magnetic amplifiers, reset current sources, and a control circuit are used to drive each LED string with equal current and to independently regulate the amount of voltage supplied to each LED to maximize efficiency.

Figure 3:
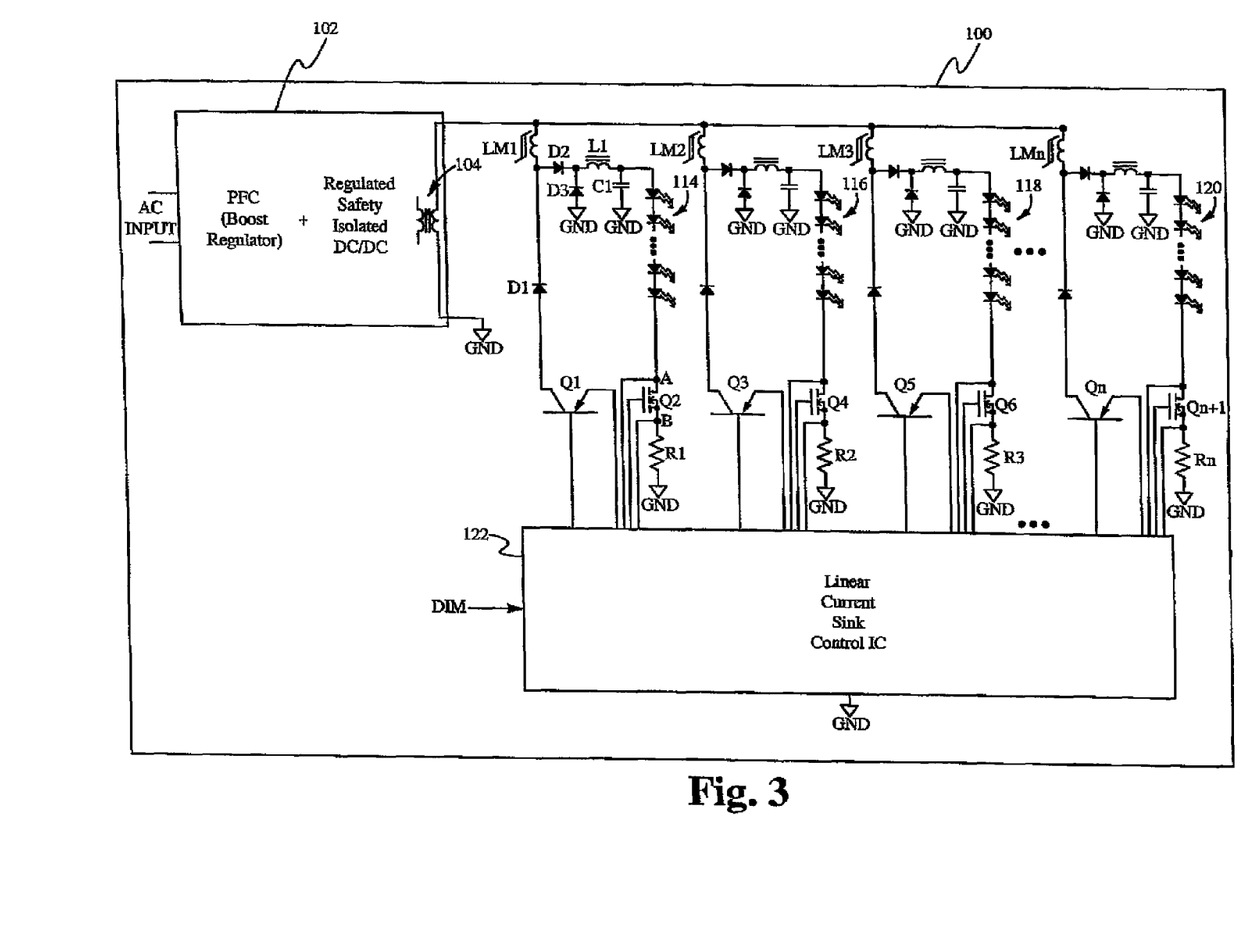
FIG. 3 illustrates a conceptual block diagram of a power circuit according to a first embodiment.

FIG. 3 illustrates a conceptual block diagram of a power circuit according to a first embodiment. The power circuit 100 includes a power conversion module 102, a plurality of magnetic amplifiers LM1-LMn, a plurality of LED strings 114-120, a plurality of transistors Q1– QN+1, and a linear current sink control circuit 122. For simplicity, only the circuit configuration and operation related to the LED string 114 is described below. The configuration and operation of the circuitry coupled to the remaining LED strings 116, 118, 120 are the same as that described related to the LED string 114.

One magnetic amplifier is coupled to one LED string, for example the LED string 114 is coupled to the output of the magnetic amplifier LM1. A rectifier circuit including a diode D2, a freewheeling diode D3, a filter inductor and filter L1, and a filter capacitor C1 is coupled between the magnetic amplifier LM1 and the LED string 114. In some embodiments, the diode D3 and the filter inductor and filter L1 may not be necessary. The transistor Q1 functions as a reset current source to provide a reset current to the magnetic amplifier LM1. It is understood that alternative types of current sources can be used. In some embodiments, the transistor Q1 is a bipolar junction transistor (BJT). In other embodiments, the transistor Q1 can be any other type of conventional transistor. A diode D1 is coupled between the transistor Q1 and the magnetic amplifier LM1. The diode D1 provides reverse voltage blockage. The transistor Q2 functions as a current sink, also referred to in this case as a current regulator, for the LED string 114. In some embodiments, the transistor Q2 is a metal-oxide-semiconductor field-effect transistor (MOSFET). In other embodiments, the transistor Q2 can be any other type of conventional transistor. The circuit operates such that the voltage at point A (drain of the transistor Q2) is at an optimal level for each LED string. The optimal voltage level at point A is high enough to maintain the transistor Q2 in the linear region so as to act as a good current sink, but low enough so as to minimize, if not eliminate, power loss across the transistor Q2. This optimal level is referred to as the minimum compliance voltage. The drain, gate, and source of the transistor Q2 are all coupled to the control circuit 122. The control circuit 122 measures the drain voltage at point A to determine a reset current to be provided by the transistor Q1 to the magnetic amplifier LM1, as will be explained in greater detail below. A control signal is sent from the control circuit 122 as a gate voltage to the transistor Q1, which in turn provides the reset current. Independent reset currents are provided by each of the other transistors Q3, Q5, and QN so as to independently regulate each LED string voltage.

In the power circuit of FIG. 3, conventional boost regulators on the secondary winding side of a power conversion module are replaced by magnetic amplifiers and controlled current sources used to regulate the current provided to each LED string. The control circuit 122 in conjunction with the current sinks function as current regulators for controlling the current provided to each LED string so that the brightness of each LED string is uniform. Power loss through each current sink, such as the transistor Q2, is minimized by sensing the voltage at point A and providing appropriate reset current to the corresponding magnetic amplifier, such as the magnetic amplifier LM1, to regulate the voltage applied to the anode of each LED string, such as the anode of the LED string 114. There is a minimum compliance voltage that must be maintained at point A in order for the transistor Q2 to function as an effective current sink and regulate the current through the LED string 114. The reset current is set to adjust the output voltage of the magnetic amplifier LM1 such that the voltage at point A is equal to the minimum compliance voltage. The minimum compliance voltage at point A can be set to any level, such as 1V, 10V, or 15V.

The control circuit 122 includes separate control loops for each LED string. A function of each control loop is to maintain a constant current through the corresponding LED string. The control loop measures the voltage at point B and compares this measured voltage to a reference voltage. The reference voltage can be a fixed value set at the time of manufacture, or the reference voltage can be externally provided as a system command. In general, the reference voltage value is application specific. The difference between the measured voltage and the reference voltage is used to determine a gate voltage supplied to the current sink transistor Q2, which regulates a constant current through the LED string 114. The brightness of the LED string 114 can be changed, not by changing the current through the LED string, but instead by adjusting the duty cycle of the current. The brightness level is received as the DIM input received by the control circuit 122.

The power conversion module 102 may combine a power factor correction (PFC) boost regulator and an isolated DC-to-DC power converter, thereby resulting in a single-stage PFC and DC-to-DC power conversion with isolation. The power conversion module 102 rectifies an input AC voltage and provides safety isolation through a transformer 104, which is a requirement of consumer electronic devices connected to an AC line. Typically, the switching frequency applied to the transformer 104 is in the range of 100-250 kHz. Frequencies greater than this range suffer from losses incurred as a result of switching at higher voltages, such as 300-400 volts. A power waveform is output at the secondary winding of the transformer 104, typically this waveform is a square wave.

In the conventional power circuits of FIGS. 1 and 2, the power waveform output from the isolating DC-to-DC converter are passed through a diode network to rectify the waveform and through a filter to smooth the waveform to a desired DC level, such as the 24 volt DC at the output of the DC-to-DC converter 14/44 in FIGS. 1 and 2. In the power circuit 100 of FIG. 3, a rectifying diode network and filter are used after the plurality of magnetic amplifiers LM1-LMn. One magnetic amplifier is coupled between the secondary winding of the transformer 104 and one of the plurality of LED strings via a corresponding rectifier filter network. As shown in FIG. 3, a magnetic amplifier LM1 is coupled between the transformer 104 and the LED string 114 via a corresponding rectifier filter network. Similarly, a magnetic amplifier LM2 is coupled between the transformer 104 and the LED string 116 via a corresponding rectifier filter network, a magnetic amplifier LM3 is coupled between the transformer 104 and the LED string 118 via a corresponding rectifier filter network, and a magnetic amplifier LMn is coupled between the transformer 104 and the LED string 120 via a corresponding rectifier filter network.

The magnetic amplifier functions substantially as a switch that can be controlled to regulate the amount of voltage provided to the coupled LED string. The characteristics of the magnetic amplifier are used to accomplish this switching and voltage regulating functionality.

Magnetic materials can be described by a B-H curve, where B is measure of the magnetic flux density and H is a measure of the magnetic field strength. Where an inductor has no core, for example a looped wire, the B-H curve is a straight line. The slope of the line is the permeability of vacuum, $\mu_0$. The field strength H is proportional to the number of windings N in the looped wire times the current I passing through the looped wire. As current I passing through the wire is increased, which corresponds to an increase in the field strength H, the flux density B increases linearly according to the permeability $\mu_0$.

A magnetic amplifier is an electromagnetic device for amplifying electrical signals. A magnetic amplifier is an inductor wound about a core made of a special magnetic material that has a substantially rectangular B-H curve and high remaining flux even after the exciting current is turned off. A magnetic amplifier may visually resemble an inductor or even a transformer wound in a toroidal core or other core shape of closed magnetic path, but the operating principle is quite different. The magnetic amplifier makes use of magnetic saturation of the core. The magnetic amplifier includes core materials designed to have a specific B-H curve shape that is highly rectangular, in contrast to the slowly-tapering B-H curve of softly saturating core materials that are often used in normal inductors or transformers.

Figure 4:
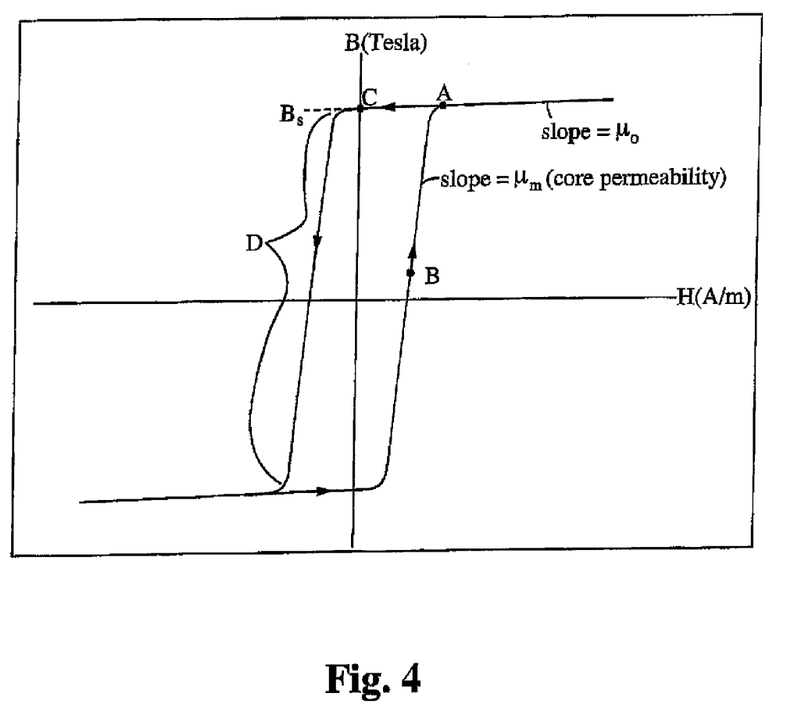
FIG. 4 illustrates an exemplary B-H curve of a magnetic amplifier.

FIG. 4 illustrates an exemplary B-H curve of a magnetic amplifier. The B-H curve of the magnetic amplifier shows hysteresis. The relationship between the field strength H and the flux density B is not linear in a magnetic amplifier. If the relationship between the two is plotted for increasing levels of field strength H, the B-H curve reaches a point where further increases in field strength H results in no further change in flux density B. This condition is called magnetic saturation. Referring to FIG. 4, as the current, which flows through the inductor windings of the magnetic amplifier, increases (positive H), the flux density B increases according to the right hand portion of the B-H curve. The slope of this portion of the B-H curve, for example at point B, is equal to the core permeability $\mu_m$ of the magnetic amplifier. The flux density B reaches a point A whereas the current continues to increase, the flux density B does not increase. In actuality, the horizontally flat portion of the B-H curve is not completely horizontal, having a positive slope equal to the vacuum permeability $\mu_0$. The core permeability $\mu_m$ is much greater than the vacuum permeability $\mu_0$, as shown by the difference in the positive slope at point B versus the relatively flat slope of the nearly horizontal line passing through point A.

When current is removed from the magnetic amplifier, the flux density B does not fall to zero. Instead, the magnetic amplifier remains saturated with a flux density $B_s$, at point C. It is shown in FIG. 4 that at H=0 (corresponding to zero current passing through the magnetic amplifier), the flux density B is not zero, but has a non-zero value $B_s$. The flux density $B_s$ is very close to the flux density B when full current is applied, such as at point A. The difference in value resulting from the slight slope $\mu_0$ of the nearly horizontal portion of the B-H curve. The non-zero value of the flux density B when H=0 is due to the magnetic characteristics of the magnetic amplifier's core material. To reduce the flux density from $B_s$, a negative current is applied to the magnetic amplifier.

The inductance L of the magnetic amplifier is proportional to the permeability $\mu$. The inductance L is an indicator of the impedance of the power circuit. The higher the inductance L, the higher the circuit impedance. The lower the inductance L, the lower the circuit impedance. When the magnetic amplified is saturated, which corresponds to the nearly horizontally flat portion of the B-H curve, the power circuit has a low impedance because the permeability of the magnetic amplifier in saturation is very small (inductance L is proportional to the permeability $\mu$). When the magnetic amplifier is not saturated, which corresponds to the B-H curve where the slope equals the core permeability $\mu_m$, the inductance of the magnetic amplifier is much higher, which results in a higher circuit impedance. It is this impedance characteristic that is applied to the power circuit of FIG. 3. When the current through the magnetic amplifier is zero, the flux density does not go to zero but instead remains at the value $B_s$, this corresponds to point C on the B-H curve. If a signal, such as a current $I_L$ input from the secondary winding of the transformer 104 (FIG. 3), is passed through the magnetic amplifier while the magnetic amplifier is in the saturated state at point C on the B-H curve, then the signal experiences low impedance because the inductance L of the magnetic amplifier at point C is low. If a current source is connected to the magnetic amplifier, such as the transistor Q1 shown in FIG. 3, so as to force negative current through the magnetic amplifier, then the magnetic amplifier is forced out of the saturated stated, as shown in section D of FIG. 4. Application of the negative current reduces the flux density B from the saturated level $B_s$ toward zero (along section D of the B-H curve). While the magnetic amplifier operates within section D of the B-H curve, any signal (current $I_L$) passing through the magnetic amplifier experiences a much higher impedance because the inductance L of the magnetic amplifier within section D is high for the amount of time it takes the applied power pulse to saturate the core. Current flows through the magnetic amplifier while saturated (low impedance), but current is substantially smaller through the magnetic amplifier while not saturated (high impedance). In this manner, the magnetic amplifier can function substantially as a switch controlled by the reset current supplied by the reset current source. The reset current source connected to the magnetic amplifier forces reset current through the magnetic amplifier in the opposite direction as the current $I_L$. The amount of this rest current is controlled by the linear current sink control circuit. Adjusting the amount of reset current modulates the amount of time that high impedance is presented by the magnetic amplifier to the power circuit, and therefore regulates the amount of current $I_L$ that passes through the magnetic amplifier by modulating the effective duty cycle.

Figure 5:
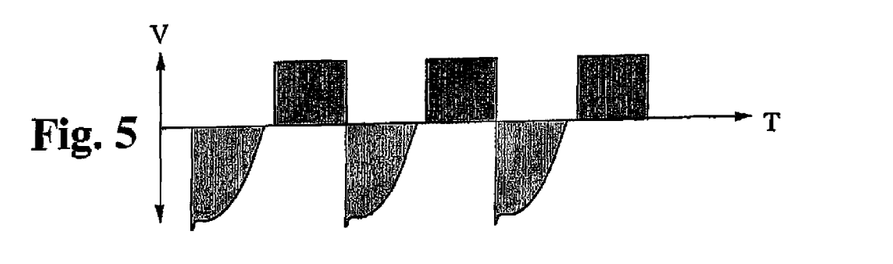
FIG. 5 illustrates an exemplary voltage curve of the voltage Vs across the secondary winding of the transformer in FIG. 3.
Figure 6:
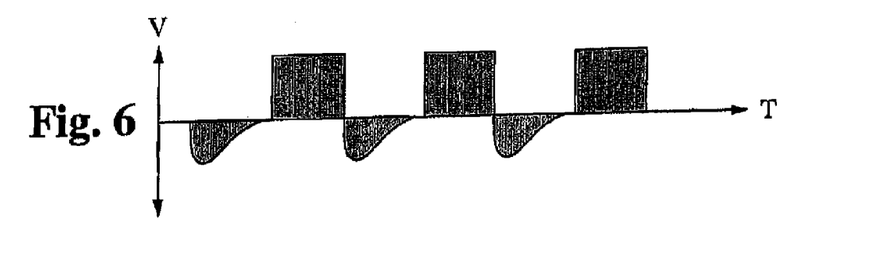
FIG. 6 illustrates the voltage across the magnetic amplifier if the magnetic amplifier is maintained in a saturated state, the magnetic amplifier receives the voltage waveform of FIG. 5.
Figure 7:
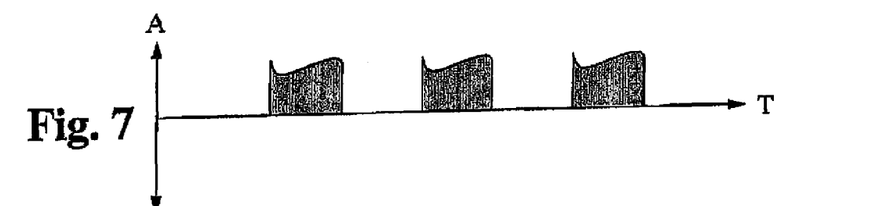
FIG. 7 illustrates the current $I_L$ passing through the magnetic amplifier if the magnetic amplifier is maintained in a saturated state, the magnetic amplifier receives the voltage waveform of FIG. 5.

FIG. 5 illustrates an exemplary voltage curve of the voltage $v_s$ across the secondary winding of the transformer 104 in FIG. 3. Power is transferred from the power conversion module 102 to the circuit connected to the secondary winding of the transformer 104. The power transfer occurs during the positive portion of the voltage Vs shown in FIG. 5. The amount of current $I_L$ that flows through the magnetic amplifier is determined by the voltage Vs applied to the magnetic amplifier and also by the amount of magnetic amplifier impedance. For example, if the magnetic amplifier is in a saturated state (point A or C in FIG. 4), then the magnetic amplifier presents essentially zero impedance to the power circuit because the B-H curve is essentially horizontal. During the positive portion of the voltage Vs, referred to as "on-time", and while the magnetic amplifier is in the saturated state, the current $I_L$ flowing through the magnetic amplifier passes through the magnetic amplifier unchanged because of the zero impedance. FIG. 6 illustrates the voltage across the magnetic amplifier if the magnetic amplifier is maintained in a saturated state, the magnetic amplifier receives the voltage waveform of FIG. 5. FIG. 7 illustrates the current $I_L$ passing through the magnetic amplifier if the magnetic amplifier is maintained in a saturated state, the magnetic amplifier receives the voltage waveform of FIG. 5.

Figure 8:
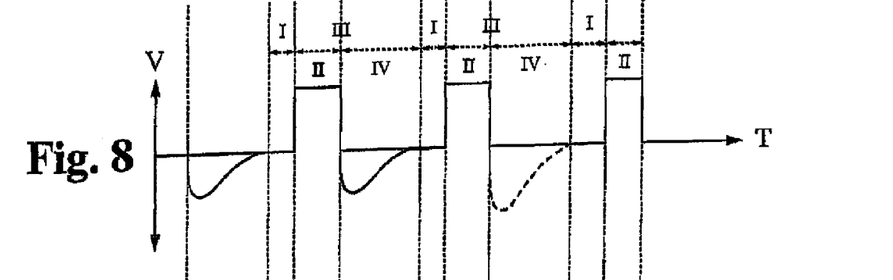
FIG. 8 illustrates the voltage across the magnetic amplifier if a reset current is applied to the magnetic amplifier during off-time, the magnetic amplifier receives the voltage waveform of FIG. 5.
Figure 9:
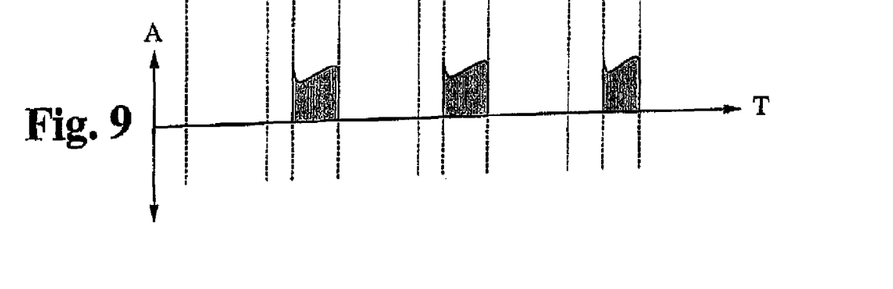
FIG. 9 illustrates the current $I_L$ passing through the magnetic amplifier if the reset current is applied to the magnetic amplifier during off-time, the magnetic amplifier receives the voltage waveform of FIG. 5.
Figure 10:
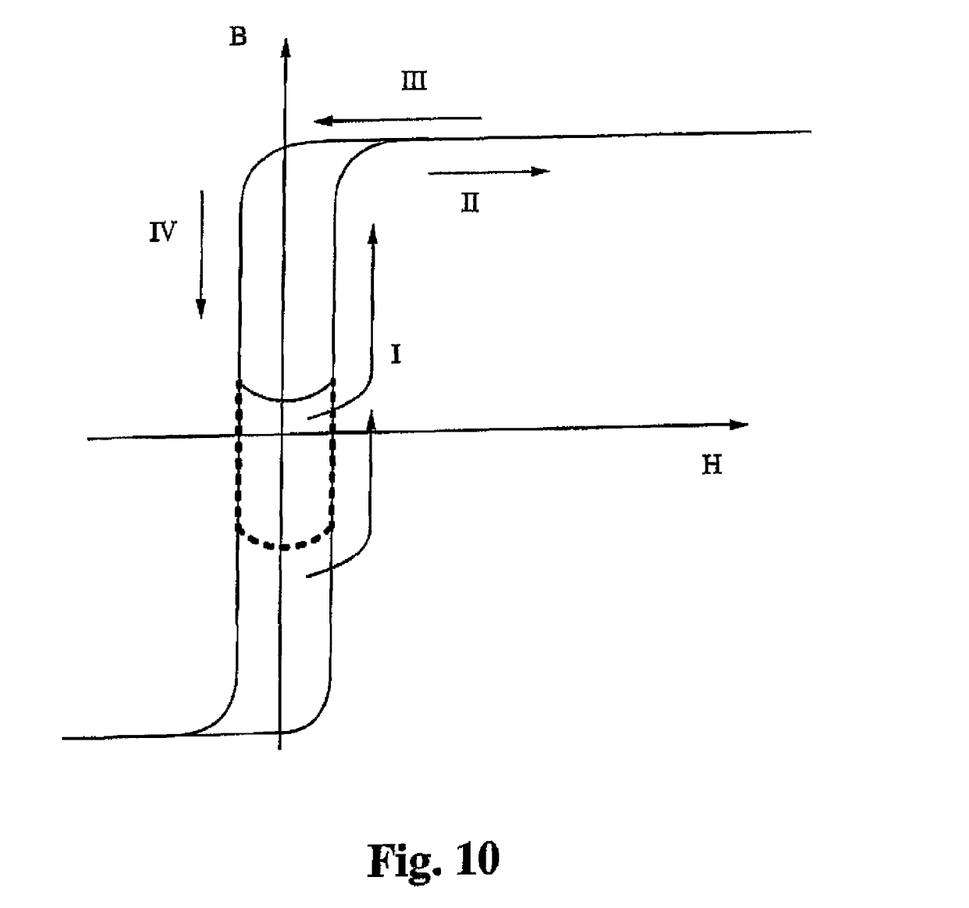
FIG. 10 illustrates the B-H curve corresponding to the waveforms shown in FIGS. 8 and 9.

If reset current is forced through the magnetic amplifier during the negative portion of the voltage Vs, referred to as "off-time", the state of the magnetic amplifier is changed according to the B-H curve. For example as reset current is applied (negative current relative to the magnetic amplifier and the magnetic amplifier B-H curve), the flux density B of the magnetic amplifier moves into section D (FIG. 4) of the B-H curve, which corresponds to high impedance. The more reset current that is applied, the further down section D of the B-H curve the magnetic amplifier moves. For the next positive portion of the voltage Vs, a finite amount of time is required for the magnetic amplifier to move back up the B-H curve and reach saturation. FIG. 8 illustrates the voltage across the magnetic amplifier if a reset current is applied to the magnetic amplifier during off-time, the magnetic amplifier receives the voltage waveform of FIG. 5. FIG. 9 illustrates the current $I_L$ passing through the magnetic amplifier if the reset current is applied to the magnetic amplifier during off-time, the magnetic amplifier receives the voltage waveform of FIG. 5. FIG. 10 illustrates the B-H curve corresponding to the waveforms shown in FIGS. 8 and 9. Period I corresponds to the magnetic amplifier returning to saturation during on-time after a reset current has been applied during off-time. Until saturation is reached, the magnetic amplifier is in the high impedance state. While in a high impedance state, current does not flow through the magnetic amplifier, as shown in period I of FIG. 9. Once saturation is reached, period II, the magnetic amplifier is in the zero impedance state and the current IL passes through. At period III, the voltage Vs applied to the magnetic amplifier changes from on-time to off-time. During off-time, reset current is applied to the magnetic amplifier, thereby moving the magnetic amplifier down the B-H curve, period IV. During the next on-time cycle, the magnetic amplifier again moves back up the B-H curve, period I.

The amount of time required for the magnetic amplifier to reach saturation during the on-time (positive portion of the voltage Vs) is dependent on the amount of reset current applied during the off-time (negative portion of the voltage Vs). The amount of reset current applied dictates how far the magnetic amplifier moves down the B-H curve. As shown in FIG. 10, the deeper B-H curve (dotted line) corresponds to more applied reset current during off-time, and the shallower B-H curve (solid line) corresponds to less applied reset current during off-time. Application of the larger amount of reset current corresponding to the dotted line in FIG. 10 corresponds to the third cycle in FIGS. 8 and 9. Application of the smaller amount of reset current corresponding to the solid line in FIG. 10 corresponds to the second cycle in FIGS. 8 and 9. Current $I_L$ only passes through the magnetic amplifier during on-time and when the magnetic amplifier is in saturation, which corresponds to the nearly horizontally section of the B-H curve. The amount of current IL that passes through the magnetic amplifier can therefore be adjusted by controlling the amount of reset current applied to the magnetic amplifier, which controls the amount of time the magnetic amplifier is saturated during on-time. It is understood that the waveforms shown in FIGS. 5-9 are for exemplary purposes only and that other waveforms can be used and achieved.

Referring to the power circuit of FIG. 3, each magnetic amplifier is used to independently control the voltage supplied to each of the LED strings. The control circuit 122 measures the voltage across the current sink transistor Q2, by measuring the voltage at point A, and also determines the LED string current passing through the resistor RI by measuring the voltage at point B. These measurements are then used to generate a control signal for the reset current source to supply a proper amount of reset current to the magnetic amplifier LM1. The proper amount of reset current enables a specified amount of voltage at point A ("the minimum compliance voltage") that results in a minimum amount of current loss in the current sink transistor Q2. In some embodiments, the defined brightness of each LED string is the same for all LED strings in the power circuit. As applied to FIG. 3, the transistor QI functions to provide the reset current to the magnetic amplifier.

Use of a magnetic amplifier provides many advantages, especially when compared to MOSFETs used in this type of application. First, magnetic amplifiers consisting of just a magnetic core and a winding can operate under high voltage conditions, for example where voltage Vs reaches 100-150 volts or even higher, and be very rugged. In contrast, high voltage MOSFETs of the type used in conventional boost regulators are not as durable and tend to breakdown more frequently. Second, switching MOSFETs generate noise due to the switching functionality. Magnetic amplifiers generate much less noise than switching MOSFETs. Third, magnetic amplifier materials are less expensive than high voltage MOSFETs. Fourth, MOSFETs require gate driver circuitry that adds to the complexity of the circuit. Magnetic amplifiers do not require such driver circuitry. Fifth, when using magnetic amplifiers, control circuitry coupled to the magnetic amplifier does not utilize explicit switching elements. The reset current provided to the magnetic amplifier is DC current and naturally turns off when the diode D1 is commuted off by the reversal of the voltage at its cathode terminal.

Figure 11:
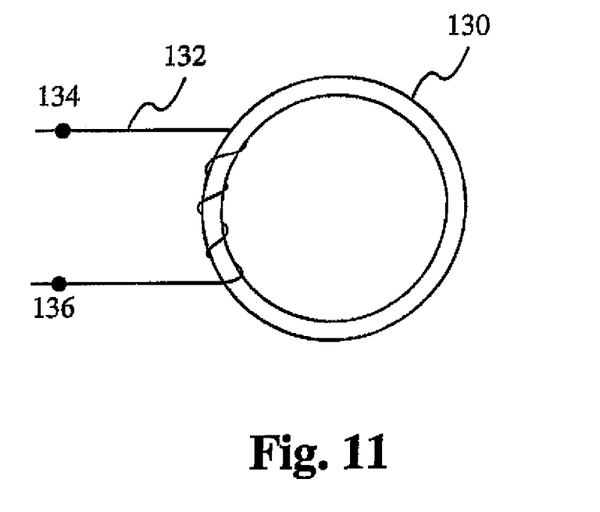
FIG. 11 illustrates an exemplary configuration of a magnetic amplifier.
Figure 12:
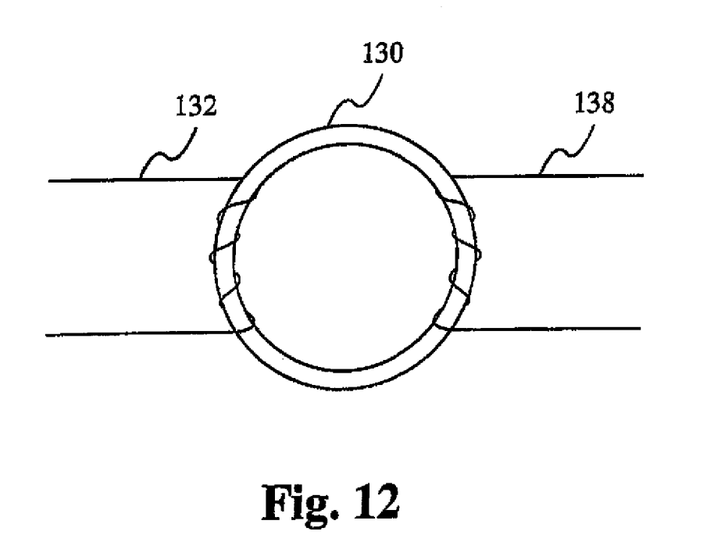
FIG. 12 illustrates an exemplary configuration of the magnetic amplifier of FIG. 9 coupled to a reset current source.

FIG. 11 illustrates an exemplary configuration of a magnetic amplifier. The magnetic amplifier includes a core 130 and a winding 132. Terminal 134 is coupled to the secondary winding of the transformer, such as transformer 104 (FIG. 3), and terminal 136 is coupled to diode D1 and diode D2 (FIG. 3). FIG. 12 illustrates an exemplary configuration of the magnetic amplifier that has a separate control winding 138 to receive the reset current. Using such a control winding may have benefits because the winding 138 can be referenced for example to ground. An additional benefit is the possibility to reduce the reset current level by way of adding more control winding turns since the reset current function of the number of control winding turns. It is understood that the configuration shown in FIG. 12 is an exemplary configuration for connecting a reset current source to the magnetic amplifier. It is also contemplated that the reset current source can be connected directly to the winding of the magnetic amplifier, such as shown in FIG. 3. The single winding 132 of FIG. 11 is used to both transmit power and to provide the reset current. In FIG. 12, the winding 132 is used to transmit power, and the winding 138 is used to provide the reset current.

Figure 13:
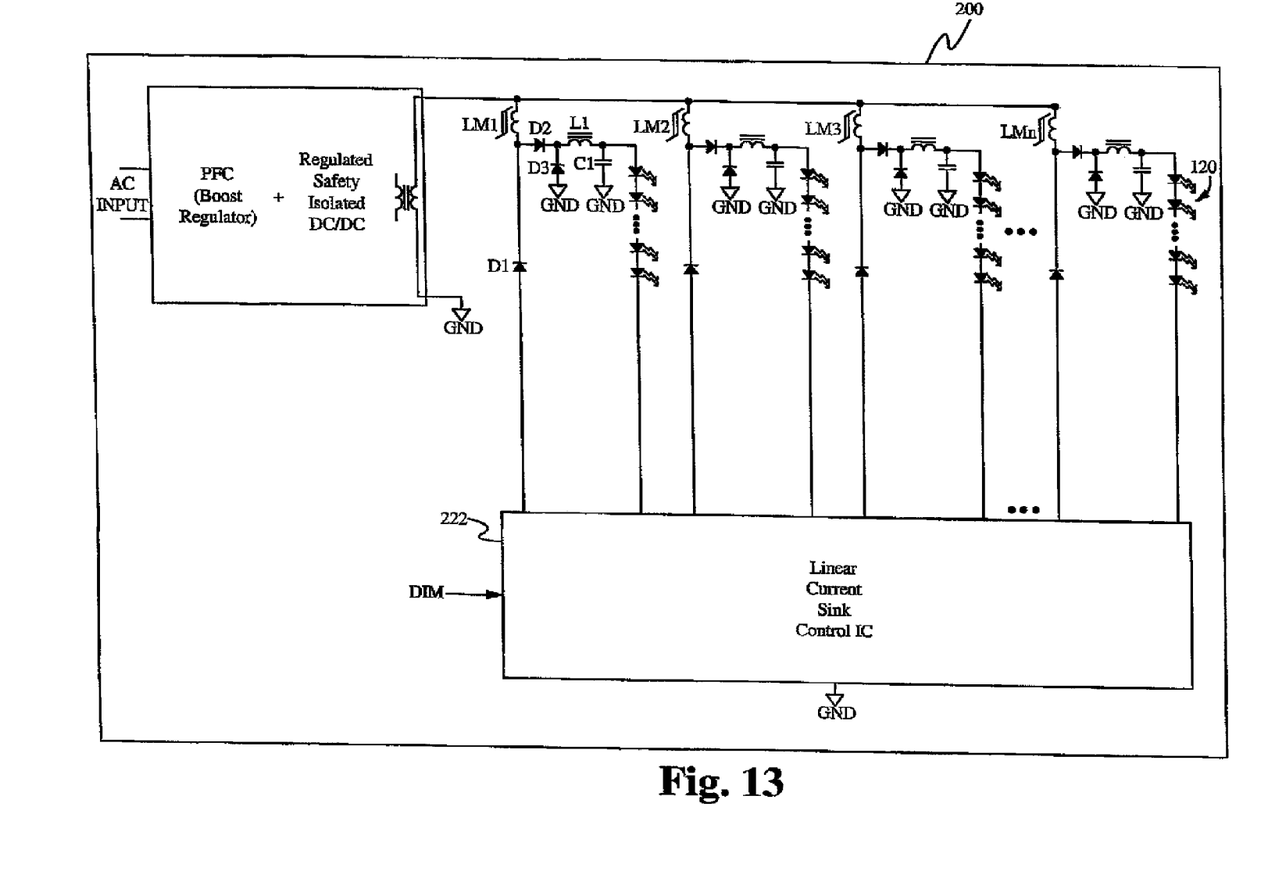
FIG. 13 illustrates a conceptual block diagram of a power circuit according to a second embodiment.

FIG. 13 illustrates a conceptual block diagram of a power circuit 200 according to a second embodiment. The power circuit 200 is similar to the power circuit 100 of FIG. 3 except that the reset current source and current sink for each LED string are integrated into the control circuit. Specifically, the control circuit 222 includes the functionality of the control circuit 122 as well as the reset current sources (transistors QI, Q3, Q5, QN) and the current sinks (transistors Q2, Q4, Q6, QN+I) of the power circuit 100. In some embodiments, the control circuit 222 is a high voltage all analog circuit having no switching PWM control circuitry.

The power circuits are described above as including a current sink coupled to each LED string to regulate the current through the LED string. In some embodiments, the current through the LED string may be directly regulated by the magnetic amplifier itself, in which case the current sink transistor is only used as a dimming ON-OFF switch. One reason for using the transistor Q2 as a current sink to regulate current is to compensate for current response time reduction resulting from passive elements in the circuit, such as the inductor L1 and the capacitor C1. For applications using a high refresh rate, such as display devices, the pulsation of the current through the LED string occurs at a high rate. In such applications, the transistor Q2 functions as a current sink that provides a means for cleanly pulsating the current at high rates. For applications that do not have as high a refresh rate, the transistor Q2 may not be needed to regulate the current through the LED string. In such applications, the magnetic amplifier may be used to regulate the current through the LED string. The control circuit senses the current at point B (FIG. 3), and in response the control circuit controls the reset current supplied to the magnetic amplifier. Such a configuration can also be used for higher rate applications if and when magnetic amplifiers are capable of handling higher rates, for example through improvements in material science technology used to generate the magnetic amplifier core material.

The elements LM1-LMn are described above as being magnetic amplifiers. A magnetic amplifier is an example of a device that uses the properties of a saturable reactor. In general, each of the elements LM1-LMn can be saturable reactors that exhibit saturation characteristics similar to those described above in relation to magnetic amplifiers. More generally, the concepts can be generalized to any device that exhibits saturation characteristics that can be manipulated to effect a duty cycle used to adjust a voltage applied to an LED string. As used herein, a magnetic amplifier refers to such a device.

The power circuit does not utilize pulse width modulation (PWM) switching controllers in the secondary side, where the secondary side is that part of the power circuit coupled to output of the secondary winding of the transformer 104. This includes both the power regulating circuitry that provides current to the LED string and the control circuitry that controls the reset current. The control circuit 122 is configured without switching elements, instead using operational amplifier ("opamp") circuitry and a reference voltage. If a switching MOSFET or boost regulator were used instead of the magnetic amplifier, as in the conventional power circuits shown in FIGS. 1 and 2, the control circuit would require more complex switching circuitry to account of the on/off timing of the switching elements.

The power circuit has been described in terms of specific embodiments incorporating details to facilitate the understanding of the principles of construction and operation of the power circuit. Such references, herein, to specific embodiments and details thereof are not intended to limit the scope of the claims appended hereto. It will be apparent to those skilled in the art that modifications can be made in the embodiments chosen for illustration without departing from the spirit and scope of the power circuit.

What is claimed is:

1. A power circuit comprising:
    a power conversion module including a transformer, a primary winding of the transformer coupled to a power source;
    a magnetic amplifier coupled to a secondary winding of the transformer, wherein the magnetic amplifier comprises a saturable magnetic core and two or more windings around at least a portion of the core;
    a light emitting diode string coupled to an output of the magnetic amplifier by a rectifier circuit, wherein the light emitting diode string includes a plurality of light emitting diodes coupled in series;
    a reset current source coupled to the output of the magnetic amplifier;
    a current sink coupled to an output of the light emitting diode string; and
    a control circuit coupled to the reset current source, the light emitting diode string, and to the current sink;
    wherein the magnetic amplifier comprises a first winding configured to transmit power to the light emitting diode string and a second winding configured to receive a reset current from the reset current source.

2. The power circuit of claim 1 wherein the power conversion module is configured for power factor correction, DC-to-DC conversion and power isolation.

3. The power circuit of claim 1 wherein at least one winding is coupled to a rectifier diode of the rectifier circuit.

4. The power circuit of claim 3 further comprising a filter inductor coupled to the rectifier diode.

5. The power circuit of claim 1 wherein the reset current source comprises a transistor.

6. The power circuit of claim 1 wherein the current sink comprises a transistor.

7. The power circuit of claim 1 wherein a B-H curve of the magnetic amplifier exhibits hysteresis where the magnetic amplifier maintains a flux density with zero current passing through substantially equal to a saturation flux density level.

8. The power circuit of claim 1 wherein the magnetic amplifier is configured to pass a power current to the light emitting diode string while in a saturated state and during an on-time of a power supply signal input to the saturable reactor.

9. The power circuit of claim 8 wherein the control circuit is configured to provide a control signal to the reset current source such that the reset current source forces a reset current through the magnetic amplifier during an off-time of the power supply signal, further wherein the magnetic amplifier changes from the saturated state to a non-saturated state due to the reset current.

10. The power circuit of claim 9 wherein the power current is delayed from passing through the magnetic amplifier during the on-time of the power supply signal until the magnetic amplifier changes from the non-saturated state to the saturated state during the on-time of the power supply signal.

11. The power circuit of claim 10 wherein an amount of the delay is a function of an amount of the reset current.

12. The power circuit of claim 11 wherein an amount of power provided to the light emitting diode string is an inverse function of the amount of the reset current.

13. The power circuit of claim 1 wherein the reset current source, the current sink, and the control circuit are integrated on a same integrated circuit.

14. The power circuit of claim 1 wherein the control circuit is configured to control the current sink so as to maintain a constant current through the light emitting diode string.

15. A power circuit comprising:
    a power conversion module including a transformer, a primary winding of the transformer coupled to a power source;
    a plurality of magnetic amplifiers coupled in parallel to a secondary winding of the transformer, wherein each magnetic amplifier comprises a saturable magnetic core and two or more windings around at least a portion of the core;

a plurality of light emitting diode strings, one light emitting diode string coupled to an output of one of the plurality of magnetic amplifiers by a rectifier circuit, wherein each light emitting diode string includes a plurality of light emitting diodes coupled in series;
a plurality of reset current sources, one reset current source coupled to the output of one of the plurality of magnetic amplifiers;
a plurality of current sinks, one current sink coupled to an output of one of the plurality of light emitting diode strings; and
a control circuit coupled to the plurality of reset current sources, to the plurality of light emitting diode strings, and to the plurality of current sinks;
wherein the magnetic amplifier comprises a first winding configured to transmit power to the light emitting diode string and a second winding configured to receive a reset current from the reset current source.

16. The power circuit of claim 15 wherein the power conversion module is configured for power factor correction, DC-to-DC conversion and power isolation.

\* \* \* \* \*